US006484026B1

(12) United States Patent
Hägebarth

(10) Patent No.: US 6,484,026 B1
(45) Date of Patent: Nov. 19, 2002

(54) PROCESS FOR CLEARING A SIM CARD

(75) Inventor: Frank Hägebarth, Kirchheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/442,244

(22) Filed: Nov. 17, 1999

(30) Foreign Application Priority Data

Dec. 11, 1998 (DE) .......................................... 198 57 210

(51) Int. Cl.⁷ ................................................ H04M 3/00
(52) U.S. Cl. ...................................... 455/419; 455/558
(58) Field of Search .............................. 455/403, 410, 455/411, 418, 419, 420, 550, 551, 558, 575

(56) References Cited

U.S. PATENT DOCUMENTS

| | | | | |
|---|---|---|---|---|
| 5,297,192 A | | 3/1994 | Gerszberg | 455/419 |
| 5,418,837 A | * | 5/1995 | Johansson et al. | 455/418 |
| 5,828,956 A | * | 10/1998 | Shirai | 455/411 |
| 5,894,596 A | * | 4/1999 | Hayes, Jr. | 455/418 |
| 6,035,189 A | * | 3/2000 | Ali-Vehmas et al. | 455/419 |
| 6,198,915 B1 | * | 3/2001 | McGregor | 455/418 |

FOREIGN PATENT DOCUMENTS

| | | |
|---|---|---|
| EP | 0 367 361 A2 | 5/1990 |
| EP | 0 778 716 A2 | 6/1997 |
| WO | WO 97/22221 | 6/1997 |

* cited by examiner

Primary Examiner—Nay Maung
Assistant Examiner—Quochien B. Vuong
(74) Attorney, Agent, or Firm—Sughrue Mion, PLLC

(57) ABSTRACT

The invention relates to a process for clearing a mobile telephone Subscribe-identify Module (SIM) card for a mobile telephone customer for a set performance parameter or for changing a performance parameter for which the SIM card is cleared. To accelerate the clearance of SIM cards, the invention proposes a process characterized by the following steps:

- selecting a communications network via a terminal,
- establishing a connection to the communications network,
- determining the customer's identity,
- going through a computer-assisted dialog that comprises at least the determination of the card number of the SIM card,
- transmitting the customer's identity and the card number of the SIM card to a mobile telephone network operator via a data transmission connection, and
- entering the transmitted data in a database of the network operator.

26 Claims, No Drawings

PROCESS FOR CLEARING A SIM CARD

BACKGROUND OF THE INVENTION

The present invention relates to a process for clearing a mobile telephone Subscribe-Identify Module (SIM) card for a mobile telephone customer for a performance parameter or for changing a performance parameter for which the SIM card is cleared.

The invention furthermore relates to a device to execute a process for clearing a mobile telephone Subscribe-Identify Module (SIM) card for a mobile telephone customer for a performance parameter or for changing a performance parameter for which the SIM card is cleared, whereby the customer can dial this device via a terminal.

Such processes and devices are known in prior art in various embodiments. If a mobile telephone customer wants to use a mobile telephone in a mobile telephone network, he must first acquire a mobile telephone and a SIM card. The SIM card has a small memory chip on which [information] can be stored, for example, the card number of the SIM card, information to identify the customer and several names with dial numbers. To be able to operate the mobile telephone in the mobile telephone network, the SIM card must first by cleared by a mobile telephone network operator. In the context of this clearance, the SIM card is assigned to a specific customer, the customer's address and banking information is stored with the mobile telephone network operator, the customer's creditworthiness is verified, the performance parameters desired by the customer (tariff, roaming, connection itemization in the invoice, etc.) are determined and a mobile telephone number by which the customer can subsequently be reached in the mobile telephone network is assigned to the SIM card. If the SIM card is inserted into the mobile telephone, the customer can call from the mobile telephone and receive calls via his mobile telephone number.

According to the known process, clearance of the SIM card is typically executed in the following steps. First, the customer completes a mobile telephone agreement with a dealer and signs it. The agreement contains information on the customer's identification, address and banking information. The mobile telephone agreement also includes the card number of a SIM card, which is to be cleared for the customer. Furthermore, a mobile telephone number is indicated, which is to be assigned to the SIM card and under which the customer can subsequently be reached in the mobile telephone network. Finally, the performance parameters desired by the customer are determined in the agreement. The completed agreement is then forwarded to the mobile telephone network operator, typically via fax. There, the information is manually stored by the network operator's personnel, the customer's creditworthiness is verified, the specified dial number is assigned to the SIM card and the SIM card is cleared for the desired performance parameters. The mobile telephone network operator typically requires one to two business days to complete these transactions to clear the SIM card. Significantly faster clearance of a SIM card would be advantageous, however.

The clearance of SIM cards and the changing of the performance parameters of the mobile telephone agreements with the mobile telephone network operator should take as little time as possible. For this purpose the network operator has to reserve a certain number of employees, which constitutes a considerable cost factor.

The process for clearing a mobile telephone SIM card according to prior art is not carried out directly by the mobile telephone network operator but via one or several dealers each of which receives a commission for contract signature. As a result, the costs for entering into a mobile telephone agreement are quite high.

On the other hand, the direct sale of mobile telephone agreements by the mobile telephone network operators via their own dealer network would be very complex and at least as expensive as the sale via one or several external dealers since their own dealer network would typically first have to be set up. Thus, the direct sale by the mobile telephone network operator via its own dealer network would not be apt to reduce the costs for concluding a mobile telephone agreement.

The interposition of several dealers bars the mobile telephone network operator from direct access to the customer. Thus, marketing campaigns on the part of the mobile telephone network operator must take the circuitous route through one or several dealers.

SUMMARY OF THE INVENTION

Based on the aforementioned disadvantages of the prior art, one object of the present invention is to design and further develop a process of the initially mentioned type, which will accelerate the clearance of SIM cards, reduce the costs for clearance and provide the mobile telephone network operators direct access to their customers without significant additional complexity or costs.

To attain this object, the invention proposes a process of the initially mentioned type characterized by the following steps:

dialing a communications network by the customer via a terminal, establishing a connection to the communications network, determining the customer's identity, going through a computer-assisted dialog comprising at least the determination of the card number of the SIM card, transmitting the customer's identity, the card number of the SIM card and the performance parameter to a mobile telephone network operator via a data transmission connection, and entering the transmitted data into a database of the network operator.

The process according to the invention assumes that the mobile telephone network operators will bring the SIM cards into circulation free of charge. This could be done, for example, within the context of a marketing campaign or through newspaper inserts.

The process according to the invention puts a potential customer into the position of being able to clear a received SIM card for specific services or performance parameters independently without the intermediation of dealers. Likewise, the process according to the invention permits the customer independently to change the established services or performance parameters at any time.

This is made possible in that the potential customer dials a communications network via his terminal. This communications network preferably has a central component, which controls certain network functions of the communications network. In communications technology such a communications network is also known as an intelligent network. The terminal is preferably embodied as a telephone or as a computer. The communications network can be dialed via a telephone network or via a computer network. The computer network is preferably embodied as the Internet. If the communications network is embodied as an intelligent network, the central component within the communications network is dialed via the terminal and a connection to the central component is established. To be able to dial the intelligent network via a computer network, the communications network must have a computer that is integrated with the computer network. The intelligent network is then accessed by calling up the Internet address of the computer of the communications network.

To dial the communications network, the potential customer either selects a communications network telephone number or the address of the communications network computer. After the connection to the communications network has been established, the identity of the potential customer is first determined. Then, a computer-assisted dialog is gone through. As a minimum, the card number of the SIM card is determined in the context of this dialog. It is feasible, however, that the communications network also receives any other information within the context of the computer-assisted dialog. Subsequently, the customer's identity, the SIM card number and the performance parameter are transmitted via a data transmission connection to the mobile telephone network operator. Finally, the transmitted data is stored in a database of the network operator.

The process according to the invention permits a significant acceleration in the clearance of SIM cards. Since the customer can clear his SIM card independently and can change the performance parameters set for his cleared SIM card independently, the mobile telephone network operator can save personnel that is currently assigned to perform these activities. This permits a cost reduction for SIM card clearance and administration. By eliminating the intermediate dealer, the mobile telephone network operators ultimately obtain direct access to their customers without significant additional complexity and without significant extra costs. This makes it possible to conduct specific marketing campaigns without time delays due to the intermediate dealers.

If the communications network is embodied as an intelligent network, the customer's identity is preferably determined in the central component of the communications network. The computer-assisted dialog is then executed on the central component of the communications network and/or the customer's identity, the card number of the SIM card and the performance parameter are transmitted from the central component to the mobile telephone network operator.

According to an advantageous further development of the present invention, a mobile telephone number is assigned to the SIM card upon clearance. In the future the customer can then be reached at this telephone number within the mobile telephone network.

According to a preferred embodiment of the invention, it is proposed that the customer's identity be manually transmitted by the customer himself via the connection to the communications network. For example, the customer can enter information regarding his identity by means of the telephone keypad, which he used to set up a connection to the communications network, and transmit this information to the communications network. It is also feasible for the customer to enter the information regarding his identity on a corresponding page on the Internet using a computer keyboard and to transmit this information to the communications network.

As an alternative, it is proposed that the identification number of the terminal be automatically transmitted via the connection to the communications network and that the customer's identity be determined by the central component of the communications network from the identification number. Automatically, in this case, means that transmission occurs without any action by the potential customer. This embodiment is particularly interesting for those network operators that operate a fixed network in addition to the mobile network. To clear his SIM card, the customer of the mobile telephone network can then use his fixed network telephone of the same network operator. Since the potential mobile telephone customer is already a fixed network customer of this network operator, information on the identity of the fixed network customer is already stored in a database of the network operator. From the identification number of the fixed network telephone, which is automatically transmitted to the communications network, the communications network can then take the information on the identity of the fixed network customer from the database and use it as the information on the identity of the mobile telephone customer.

Likewise, when setting up a connection via a computer network, the customer's identification number within the computer network can be automatically transmitted to the communications network. From the customer's identification number, the communications network can then determine the information on the customer's identity, for example, from a database.

According to a preferred embodiment of the invention, the customer himself manually transmits the card number of the SIM card via the connection to the communications network. The card number is transmitted via a telephone, a computer, or some other input device using a keyboard, voice control or in some other manner.

Alternatively, it is proposed that the card number of the SIM card be automatically transmitted via the connection to the communications network. In this embodiment, the potential customer can use his mobile telephone with the still uncleared SIM card to set up a connection to the communications network. Telephoning within a mobile telephone network without a SIM card, or with a still uncleared SIM card, is possible in principle (e.g., the emergency number 112 [Germany's equivalent of 911] can be dialed from a mobile telephone even without a SIM card). If a call is made within the mobile telephone network with a non-cleared SIM card, the mobile telephone network can cause the calling mobile telephone to transmit the card number stored on the SIM card or the mobile telephone network itself can access the stored card number. Of course, this presumes that the card number is stored on the memory chip of the SIM card and that the content of the memory chip can be accessed from outside via the mobile telephone network. In this embodiment, manual entry of the card number may be eliminated.

According to a particularly advantageous further embodiment of the invention, it is proposed that the customer conduct the computer-assisted dialog using voice commands or the Dial Tone Multi-Frequency (DTMF) method. For this purpose, the communications network must have means to convert voice commands or touch tones to the corresponding commands. The voice commands or touch tones are transmitted via the connection established between the telephone and the communications network and only in the communications network, preferably by the central component of the intelligent network, are they converted into the corresponding commands to execute the computer-assisted dialog. Voice commands or the DTMF method can also be used to enter the information regarding the potential customer's identity and the card number of the SIM card.

According to a preferred embodiment, at least one query to verify the customer's identity is performed in the context of the computer-assisted dialog. This query can consist, for example, of a request for a personal identification number (PIN) or other personal data such as the identification card number, etc.

Advantageously, at least one query is conducted in the context of the computer-assisted dialog to determine a performance parameter. This makes it possible initially to set the desired services/performance parameters during clearance of the SIM card. If a SIM card has already been cleared, the set performance parameters can be conveniently and quickly changed.

According to an advantageous further development, the invention proposes that a Short Message Service (SMS) message or electronic mail (e-mail) be used to inform the customer of the successful clearance of the SIM card or the successful change of a performance parameter. This message advantageously transmits the set performance parameters to the customer. Likewise, if the SIM card is not cleared or if the performance parameters are not changed, the customer can be informed of the problems that occurred during clearance or during the change.

A further object of the present invention is to design and further develop a device of the initially cited type to permit accelerated clearance of SIM cards so as to save clearance costs and to provide the mobile telephone network operator with direct access to its customers without significant additional complexity and without significant extra costs.

To attain this object, the invention proposes a device of the initially mentioned type with means to establish a connection from the terminal to the device, means to determine the customer's identity, means to go through a computer-assisted dialog that comprises at least the determination of the card number of the SIM card, means to transmit the customer's identity, the card number of the SIM card and the performance parameter to a mobile telephone network operator via a data transmission connection, and means to enter the transmitted data into the database of the network operator.

Detailed Description of the Invention

According to an advantageous further development of the invention, it is proposed that the device be embodied as a communications network with a central component for controlling specific network functions of the communications network. In communications technology such a network is also known as an intelligent network.

The terminal that the mobile telephone customer uses to dial the communications network and to set up a connection between the customer and the communications network is preferably embodied as a telephone. Alternatively, it is proposed that the terminal be embodied as a computer. The computer advantageously forms part of a computer network. The computer network is preferably embodied as a worldwide data transmission and information network, particularly the Internet.

If the communications network is an intelligent network, the means for determining the customer's identity, according to a preferred embodiment of the present invention, are preferably embodied as the central component of the communications network. Likewise, it is proposed that the means for going through a computer-assisted dialog be embodied as the central component of the communications network.

According to a particularly preferred embodiment, it is proposed that the means for determining the customer's identity receive information via the connection, which provides information about the customer regarding his identity and transmits it to the device via the connection.

According to a preferred embodiment it is proposed that the means for determining the customer's identity receive the identification number of the terminal via the connection between the terminal and the communications network and determine the customer's identity based on the identification number. If the potential mobile telephone customer is already a fixed network customer of the same network operator, the means for determining the customer's identity can access a data inventory of the network operator and determine the information regarding the customer's identity from the identification number.

According to a particularly preferred embodiment, the device is voice controlled or controlled via the keypad of a telephone that operates according to the Dial Tone Multi-Frequency method. For this purpose, the invention proposes that the means for going through the computer-assisted dialog be provided with means for controlling the dialog by voice or by the Dial Tone Multi Frequency (DTMF) method.

According to a preferred embodiment, the means for going through the computer-assisted dialog have means for verifying the customer's identity. This makes it possible to prevent misuse by unauthorized persons during clearance or during a change of the performance parameters of a SIM card. Likewise, the means for going through the computer-assisted dialog preferably have means for determining a performance parameter. With these means for determining the performance parameters, the desired services and/or performance parameters may be set or changed.

According to a preferred embodiment, the device has means for informing the customer of the successful clearance of the SIM card or the successful change of a performance parameter by a Short Message Service (SMS) message or by electronic mail (e-mail). Advantageously, the means to inform the customer transmit the set performance parameters in this message.

What is claimed is:

1. A process to clear a mobile telephone Subscribe-Identify Module (SIM) card for a mobile telephone customer for a performance parameter, the process comprising:

dialing a communications network by the customer via a terminal;

establishing a connection to the communications network;

determining the customer's identity;

executing a computer-assisted dialog that comprises at least the determination of the card number of the SIM card;

transmitting data including the customer's identity, the card number of the SIM card and the performance parameter to a mobile telephone network operator via a data transmission connection;

entering the transmitted data into a database of the network operator; and assigning a mobile telephone number for the mobile telephone to the SIM card after said transmitting of the data.

2. The process according to claim 1, wherein a central component for controlling specific network functions in the communications network is dialed via the terminal and a connection to the central component is established.

3. The process according to claim 2, wherein at least one of (1) the identity of the customer is determined in the central component, (2) the computer-assisted dialog is executed in the central component, and (3) the identity of the customer, the card number of the SIM card and the performance parameter are transmitted from the central component to the mobile telephone network operator.

4. The process according to claim 1, wherein the customer manually transmits the customer's identity via the connection to the communications network.

5. The process according to claim 1, wherein the identification number of the terminal is automatically transmitted via the connection to the communications network, and wherein the central component of the communications network determines the customer's identity from the identification number.

6. The process according to claim 1, wherein the customer manually transmits the card number of the SIM card via the connection to the communications network.

7. The process according to claim 1, wherein the card number of the SIM card is automatically transmitted via the connection to the communications network.

8. The process according to claim 1, wherein the customer carries out the computer-assisted dialog using one of voice commands, and a Dial Tone Multi-Frequency (DTMF) method.

9. The process according to claim 1, wherein at least one query to verify the identity of the customer is carried out in the context of the computer-assisted dialog.

10. The process according to claim 1, wherein at least one query to determine the performance parameter is carried out in the context of the computer-assisted dialog.

11. The process according to claim 1, wherein the customer is informed of the successful clearance of the SIM card or the successful change of the performance parameter via one of (1) a short message service (SMS) message, and (2) electronic mail (e-mail).

12. The process according to claim 11, wherein the performance parameter entered into the database is transmitted to the customer in the message.

13. A device for performing a process to clear a mobile telephone Subscribe-Identify Module (SIM) card for a mobile telephone customer for a performance parameter, whereby the device can be dialed by the customer via a terminal, the device comprising:

means for establishing a connection from the terminal to the device;

means for determining the customer's identity;

means for executing a computer-assisted dialog that comprises at least the determination of the card number of the SIM card;

means for transmitting data including the customer's identity, the card number of the SIM card and the performance parameter to a mobile telephone network operator via a data transmission connection;

means for entering the transmitted data into the database of the network operator; and means for assigning a mobile telephone number for the mobile telephone to the SIM card after the data has been transmitted to the mobile telephone network.

14. The device according to claim 13, wherein the device is a communications network having a central component for controlling specific network functions.

15. The device according to claim 14, wherein the means for determining the customer's identity is the central component of the communications network.

16. The device according to claim 14, wherein the means for going through a computer-assisted dialog is the central component of the communications network.

17. The device according to claim 14, wherein the means for determining the customer's identity receives information via the connection, which information the customer provides and transmits to the device via the connection.

18. The device according to claim 14, wherein the means for determining the customer's identity receives an identification number of the terminal via the connection and determines the customer's identity from the identification number. of the communications network.

19. The device according to claim 15, wherein the terminal is a telephone.

20. The device according to claim 15, wherein the terminal is a computer.

21. The device according to claim 20, wherein the computer is part of a computer network.

22. The device according to claim 21, wherein the computer network is a worldwide data transmission and information network.

23. The device according to claim 13, wherein the means for going through the computer-assisted dialog includes means for controlling the dialog through one of voice and a Dial Tone Multi-Frequency (DTMF) method.

24. The device according to claim 13, wherein the means for going through the computer-assisted dialog includes means for verifying the customer's identity.

25. The device according to claim 13, wherein the means for going through the computer-assisted dialog includes means for determining a performance parameter.

26. The device according to claim 13, wherein the device has means for informing the customer of the successful clearance of the SIM card or the successful changing of a performance parameter by one of a Short Message Service (SMS) message, and electronic mail (e-mail).

* * * * *